Nov. 8, 1960

R. S. JAMIESON 2,959,252

DAMPER FOR TRANSDUCER

Filed April 17, 1958

INVENTOR:
Robert S. Jamieson
BY
Edward L. Amonette

Agent

Nov. 8, 1960  R. S. JAMIESON  2,959,252
DAMPER FOR TRANSDUCER
Filed April 17, 1958  2 Sheets-Sheet 2

INVENTOR:
Robert S. Jamieson
BY
Edward L. Amonette
Agent

# United States Patent Office 2,959,252
Patented Nov. 8, 1960

2,959,252

DAMPER FOR TRANSDUCER

Robert S. Jamieson, Costa Mesa, Calif., assignor to Ultradyne, Inc., Albuquerque, N. Mex., a corporation of New Mexico Filed Apr. 17, 1958, Ser. No. 728,958

3 Claims. (Cl. 188—87)

My invention relates to measuring instruments which electromagnetically sense an acceleration or a displacement and produce an electrical signal in response thereto. More particularly, my invention relates to that class of measuring instruments in which changes in the phenomenon being measured vary the reluctance of a magnetic circuit, generating a proportional electrical signal. My invention wil be described with particular reference to its use as an accelerometer, although it will be apparent that with slight modifications it may be used as a displacement or thickness gage as well.

Among the advantages of my invention over accelerometers of the prior art are its smaller size, its wider frequency response, and its greater resistance to shock and vibration. It will produce a greater output signal for a given change in acceleration than will earlier accelerometers over the same frequency range; or it will operate through a wider frequency range with some sacrifice in the amplitude of the output signal. An important feature of the invention is the provision of vibration-damping means which provides a relatively constant degree of damping regardless of the ambient temperature.

The electrical portion of the invention is quite versatile, being capable of acting as a four-arm bridge, or as a differential transformer. By simplifying the circuitry of the preferred embodiment, the invention may be connected as two arms of a bridge circuit, as the coil of a Colpitts oscillator, or as the coil of a Hartley oscillator. Other connections will occur to one skilled in the art.

Briefly, the preferred embodiment of my invention includes an S-shaped magnetic core having three substantially parallel segments, and having an electromagnetic coil wound on each segment. Spring-mounted to move in unison are two magnetic bridging members which operate in response to an accelerating force to bridge the gap in the magnetic circuit connecting the center coil and an adjacent coil, while the other magnetic member acts to increase the gap between the center coil and the adjacent coil on its other side. This action is reversed by a reversal in the direction of the acceleration. Thus the degree of magnetic coupling between the center coil and each of the adjacent coils varies with acceleration, and the direction of acceleration may be determined by determining which of the outside coils is coupled most closely with the center coil.

In the design of accelerometers the problem arises of constructing an instrument which will differentiate between acceleration forces and vibration forces, since in some applications vibrations are such as to create an output signal which obscures the acceleration-responsive signal. By means of a novel vibration-damping system I have been able to create an accelerometer which is far superior to those of the prior art in this respect. In my system damping of vibrations is obtained by expending energy in the viscous friction between two damping surfaces moving relative to one another in a viscous medium. Previous devices operating on this principle were quite temperature-sensitive, since viscosity varies considerably with temperature.

In a preferred embodiment of my invention, two bimetallic spherical surfaces are mounted within a silicone oil medium, one attached to the accelerometer framework and the other attached to the spring-mass system, which includes the two magnetic bridging members. Vibration of the bridging members moves one damping element to the other, creating a laminar flow of oil between the two elements. As the oil viscosity decreases with rising temperature, the damping elements flatten out by bimetallic action, bringing greater portions of the elements into close proximity with one another. This increases the damping force, compensating for the decrease in oil viscosity and maintaining a relatively constant damping effect on the spring-mass systems.

A better understanding of my invention may be had, and other advantages will become apparent by reading the following more detailed description in conjunction with the attached drawings, in which.

Figure 1:
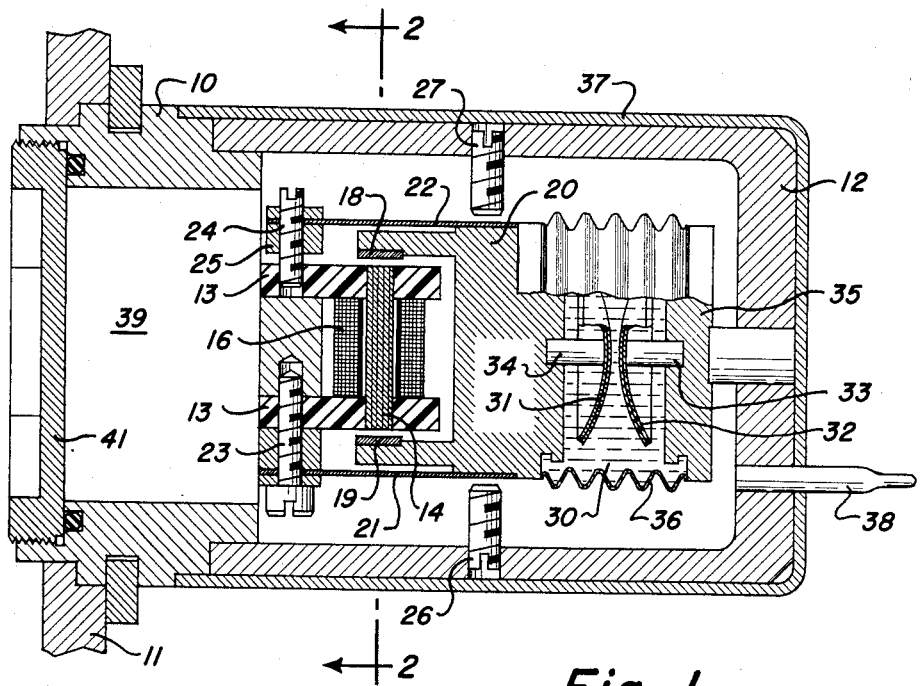
Fig. 1 is a longitudinal sectional view of a preferred embodiment of my invention.
Figure 2:
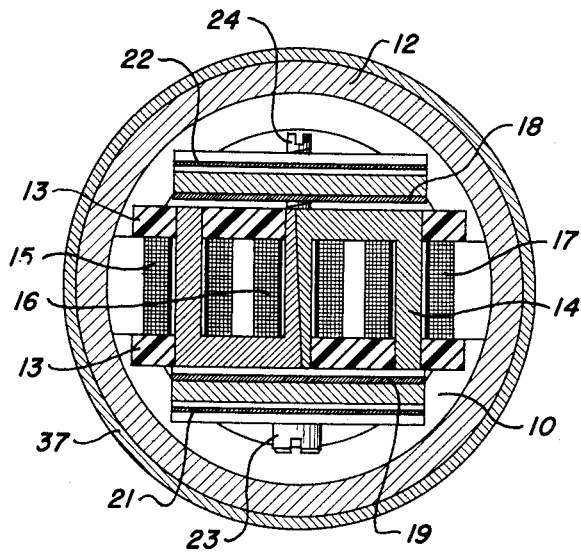
Fig. 2 is a cross-sectional view of the same embodiment, taken along the line 2—2 of Fig. 1.

Referring now to Figs. 1 and 2, mounting ring 10 supports the instrument perpendicular to a wall 11. Casing 12 is securely fastened to the mounting ring and surrounds the working parts of the instrument. Outer shell 37 provides a hermetic seal when desired, pinch-off tube 38 being used in evacuating the instrument or filling it with an inert gas. If the hermetic seal is desirable, portion 39 may be filled with potting compound through which electrical leads (not shown) may extend. As an alternative, or in addition, to potting compound, end plate 41 may be installed. Nonmagnetic mounting plates 13 are fastened to the mounting ring and to magnetic core 14 which extends through the mounting plates at top and bottom. Electrical coils 15, 16, and 17 encircle parallel portions of the S-shaped magnetic core and are securely cemented thereto.

Magnetic bridging members 18 and 19 are suspended above and below the magnetic core as part of a spring-mass system. Nonmagnetic mass 20 rigidly connects the two magnetic bridging members and is itself mounted on supporting ring 10 by cantilever springs 21 and 22. Spring 21 is fastened securely to mounting ring 10 by screw 23 while the position of spring 22 is adjustable relative to the mounting ring by means of differential screw 24. Supporting block 25 is securely fastened to spring 22, but is free from the mounting ring. Differential screw 24 threadably engages the supporting block and mounting ring 10, but with a small difference in thread pitch between these two members. This affords a very fine adjustment of the spring-mass system, since the movement of screw 24 in and out of the engaged portions will cause the movement of supporting block 25 and the entire spring-mass system in proportion to the difference in thread pitch. This difference can be chosen to be much smaller than a single pitch which it would be possible to machine on a typical screw. Due to the cantilever action of the two springs, adjustment of screw 24 will adjust the positions of both bridging members 18 and 19 relative to the magnetic core equally but in opposite directions for a single direction of movement of the screw.

When subjected to accelerations the spring-mass will react to components of acceleration in the vertical plane of Fig. 1, bringing bridging member 18 towards or away from magnetic core 14, while bridging member 19 is moved in the same directions. Components of acceleration in planes other than the vertical have no effect on the position of the bridging members relative to the magnetic core. Stop screws 26 and 27 are externally adjustable and prevent damage to the instrument from excessive accelerations.

In the normal use of an accelerometer such as the one described herein, it may be mounted on a self-propelled vehicle the acceleration of which is desired to measure. Such a vehicle will generally transmit unwanted vibrations to the accelerometer from the engine and other vibrating parts of the vehicle. These vibrations are usually of a higher frequency than are the desired accelerations. Hence it is desirable to incorporate in the instrument some means for damping the higher frequency vibrations which would otherwise cause the instrument to transmit a noisy signal. The novel damping means which I have incorporated in the accelerometer dissipates the vibrational energy within a viscous medium.

As shown in Fig. 1, supported within viscous medium 30 are two damping members 31 and 32. These two members are identically constructed as shell-like portions of a sphere and are mounted with the convex surfaces facing each other. These shells are bimetallic, being manufactured from any of the pairs of bimetals commonly used in making temperature-responsive instruments. The damping members are mounted by means of center posts 33 and 34, member 32 being attached to endplate 35 which is in turn affixed to mounting ring 10 by means of casing 12. Thus, damping member 32 is stationary with respect to movement of the spring-mass system. Damping member 31 is similarly mounted on the spring-mass system itself and therefore follows the movements of that system in response to accelerations. Bellows 36 is made of a flexible material such as Mylar and serves to contain viscous medium 30 so that it will not flow into the spaces between the magnetic bridging members 18 and 19 and the magnetic core 14 and thereby possibly adversely affect operation of the instrument.

The action of the damping means is as follows: During relatively slow accelerations damping member 31 will be moved slowly with respect to damping member 32, and the viscous medium will adjust itself accordingly without offering much resistance to the movement of member 31. However if the spring-mass system is vibrated at a considerably higher frequency, the vibration of damping member 31 relative to damping member 32 will be impeded to an extent dependent upon several factors: (1) the viscosity of the damping medium, (2) the distance between damping members, and (3) the areas and shapes of the two damping members. It is apparent that the desired degree of damping can be obtained readily at a given temperature by choice and adjustment of these three parameters. When the temperature changes from that at calibration, however, the viscosity of the viscous medium 30 also changes. Some relief from this problem is afforded by the use of silicone oils but there still remains some change in viscosity with temperature. If no provision is made for changing either of the other two parameters with temperature changes, as was the case with prior art damping means, the change in viscosity allows a variance in the laminar flow of the viscous medium between the two damping members, changing the effective damping with a change in temperature.

By constructing damping members 31 and 32 bimetallically I have provided a way of compensating for the change in viscosity of the viscous medium with temperature. As the temperature rises, for instance, the viscosity of viscous medium 30 will lower, and the viscous friction between the two damping members would decrease if they remained the same shape as they were at the lower temperature. However, the effect of the temperature rise on the bimetallic members is to cause them to flatten or to appear as portions of a larger sphere than that which they represented at a lower temperature. Due to the damping members being mounted on a common center line the distance between them at that point will not change with temperature. However, the remaining portions of the two damping members will approach each other as the temperature increases, thereby offering a greater restriction to the flow of the viscous medium between them. By correct choice of the viscous medium and of the degree of curvature and degree of temperature response of the damping members, the damping correction afforded by the change in shape of the members will to a large part cancel the opposing effect of the change in viscosity. The compensation afforded by the bimetallic action is much greater than could be accomplished by merely narrowing the gap between the damping members without changing their shape.

In comparing the damping action of my instrument with that of a similar instrument having no bimetallic action to compensate for the change in viscosity, I have found that over a temperature range from room temperature to above 200° F. the amount of damping afforded by my instrument changed less than one-eighth as much as did that offered by the other instrument. Although I have shown two bimetallic elements operating in combination, it will be recognized that my invention could be embodied in a single bimetallic element operating in conjunction with a surface of fixed size and shape. Such an embodiment might still appear as shown in Fig. 1, with the change that either damping member 31 or 32 would not be bimetallically constructed.

Figure 3:
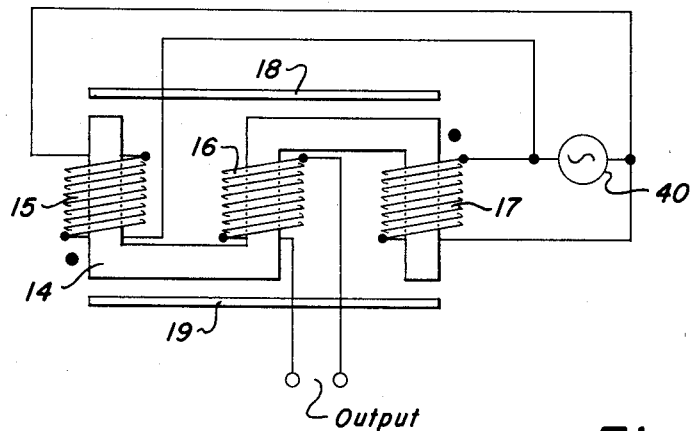
Fig. 3 is a diagrammatic representation of the electromagnetic portion of my invention, showings its use as a replacement for a four-arm bridge.

As shown in Fig. 3, coils 15 and 17 may be connected to a common A.C. source 40 in such a manner that the magnetic fluxes which those coils generate flow in opposite directions through the center leg of magnetic core 14 and flow in the same direction in another magnetic circuit including magnetic bridging members 18 and 19 and the space gaps between these members and the S-core. In the circuit arrangement coil 16 is used as a secondary winding which generates an output signal in response to the magnetic flux in the center leg of core 14. Assuming that coils 15 and 17 are identical and that the spacings between magnetic bridging members 18 and 19 and the S-core have been properly adjusted, equal but opposing magnetic fluxes will be present in the center leg of the core, generated by coils 15 and 17. These fluxes will cancel each other, and there will be no output signal generated by coil 16. This is the condition found in the absence of an accelerating force.

Assume now that an accelerating force is applied, forcing magnetic bridging member 18 towards the S-core and member 19 away from it. This will narrow the space gap in the magnetic circuit including coils 15 and 16, thereby decreasing the reluctance of that circuit and increasing the amount of flux in the center leg due to coil 15. At the same time, the space gap between magnetic bridging member 19 and the S-core will be widened, increasing the reluctance in the magnetic circuit including coils 16 and 17 and decreasing the amount of flux in the center leg due to coil 17. The result is that coil 16 will generate an output signal whose phase and amplitude are determined to a large extend by the signal flowing in coil 15. If the direction of acceleration is reversed, bridging member 19 will move closer to the S-core and member 18 will move away from it. This reverses the conditions within the core previously described, with the resultant flux in the center leg and the output signal reversing their phase and now having their amplitudes determined to a large extent by the signal flowing in coil 17. It is seen that the action of the circuit is much like that of a four-arm bridge circuit, so that it could be substituted therefor in many applications.

Figure 4:
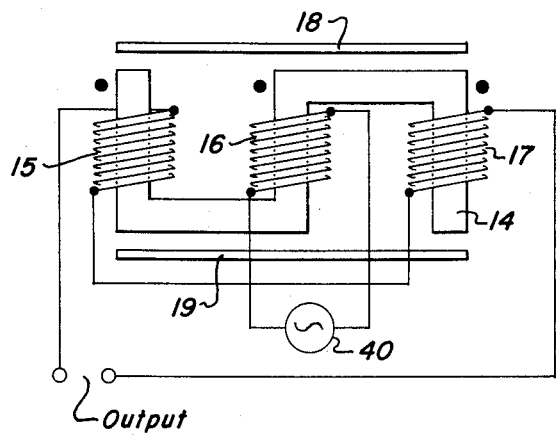
Fig. 4 is similar to Fig. 3, but showing the instrument connected as a differential transformer.

In the differential transformer connection, shown in Fig. 4, A.C. source 40 is connected to center coil 16, while coils 15 and 17 are connected series opposing as the output circuit. When the spring-mass system is balanced with respect to the core, equal and opposite voltages are generated in the two output coils, so the net output of the circuit is zero. If a displacing force moves magnetic bridging member 18 towards the core and member 19 away from it, the coupling between coils 16 and 15 will be increased, while the coupling between coils 16 and 17 will be decreased. This will cause a greater signal to be generated in coil 15 than in coil 17, and the output signal will have a phase and amplitude in accordance therewith. A displacement of the spring-mass system in the other direction will cause the signal of coil 17 to override that of coil 15 and the phase of the output signal will reverse. Of course in either instance the amplitude of the output signal is determined by the amount of displacement. The transducer is also capable of use as a passive instrument in which the impedances of coils 15 and 17 are used as an indication of acceleration or displacement. In this instance, coil 16 is not needed. Coils 15 and 17 may be connected as shown in Fig. 4, with the addition of an output lead from their junction. This would allow their being connected as two legs of a conventional bridge circuit. Or either of the two coils may be connected individually, making the instrument a single-coil variable-reluctance transducer. The single coil could be connected as part of a Colpitts oscillator. At least one other circuit arrangement is feasible: Coil 16 could be connected in series with either of the other two coils, an output lead being brought out from their junction. The two end leads and the junction lead could then be connected into a Hartley oscillator.

It is seen that the instrument is quite versatile, any number of connections being possible according to the demands of a particular telemetering application. By building the basic instrument with the leads of the individual coils brought out to terminals, the electrical connections could be made as desired without changing the internal parts of the transducer. Although I have described in detail a preferred embodiment of my invention it should be understood that variations in structure and use will occur to those skilled in the art and that my invention is limited only by the claims below.

I claim as my invention:

1. A vibration-damping system comprising a first and a second damping member, at least one of which is a bimetallic portion of a sphere convexly facing the other, the bimetallic operation being such as to change the curvature of the member to that of a larger sphere with a rise in temperature, the first being mounted on a non-vibrational member and the second being mounted facing the first on a vibrational member; a viscous fluid held between said damping members whereby vibratory motion of the second relative to the first will be damped by viscous friction.

2. A vibration-damping system as in claim 1 wherein both damping members are bimetallic portions of spheres.

3. A vibration-damping system as in claim 2 wherein the damping members are circular and are mounted along a common center line.

References Cited in the file of this patent

UNITED STATES PATENTS

| | | |
|---|---|---|
| 1,883,514 | Boyer | Oct. 18, 1932 |
| 2,046,723 | Brownscombe | July 7, 1936 |
| 2,440,605 | Hathaway | Apr. 27, 1948 |
| 2,514,140 | O'Connor | July 4, 1950 |
| 2,759,157 | Wiancko | Aug. 14, 1956 |
| 2,837,175 | Schweitzer | June 3, 1958 |
| 2,881,868 | Frykman | Apr. 14, 1959 |

FOREIGN PATENTS

| | | |
|---|---|---|
| 484,667 | Canada | July 8, 1952 |